(12) United States Patent
Jang (10) Patent No.: US 12,534,073 B2
(45) Date of Patent: Jan. 27, 2026

(54) METHOD AND SYSTEM FOR GENERATING OBSTACLE AVOIDANCE PATH

(71) Applicant: HL Klemove Corp., Incheon (KR)

(72) Inventor: Sungwoo Jang, Incheon (KR)

(73) Assignee: HL Klemove Corp., Incheon (KR)

( * ) Notice: Subject to any disclaimer, the term of this patent is extended or adjusted under 35 U.S.C. 154(b) by 215 days.

(21) Appl. No.: 18/495,806

(22) Filed: Oct. 27, 2023

(65) Prior Publication Data

US 2024/0383470 A1 Nov. 21, 2024

(30) Foreign Application Priority Data

May 17, 2023 (KR) ........................ 10-2023-0063617

(51) Int. Cl.
*B60W 30/09* (2012.01)
*B60W 10/04* (2006.01)
*B60W 10/20* (2006.01)
*G08G 1/16* (2006.01)

(52) U.S. Cl.
CPC ............ *B60W 30/09* (2013.01); *B60W 10/04* (2013.01); *B60W 10/20* (2013.01); *G08G 1/16* (2013.01); *B60W 2710/20* (2013.01); *B60W 2720/106* (2013.01)

(58) Field of Classification Search
CPC ...... B60W 30/09; B60W 10/04; B60W 10/20; B60W 2710/20; B60W 2720/106; B60W 30/08; G08G 1/16; G01C 21/3446; G01C 21/3453

See application file for complete search history.

(56) References Cited

U.S. PATENT DOCUMENTS

| 2011/0235864 A1* | 9/2011 | Shimizu ................. G08G 1/163 |
| 2019/0009412 A1* | 1/2019 | Khan et al. ............ B25J 9/1643 |
| 2020/0298878 A1* | 9/2020 | Lucet et al. ....... B62D 15/0285 |
| 2021/0403049 A1* | 12/2021 | Funke ............... B60W 60/0025 |
| 2023/0280164 A1* | 9/2023 | Kikkawa et al. .... G01C 21/206 |

FOREIGN PATENT DOCUMENTS

CN 111176284 * 1/2020 ........... G05D 1/0223

* cited by examiner

*Primary Examiner* — Brodie J Follman
(74) *Attorney, Agent, or Firm* — Harvest IP Law, LLP (57) ABSTRACT

A method for generating an obstacle avoidance path, performed by at least one processor includes generating a reference path from an initial location to a target location for a moving object to move, providing the generated reference path to a controller for generating a control value of the moving object to generate a control value corresponding to the reference path, providing the generated control value to a kinematic model related to the moving object to extract a state for the moving object to follow the reference path, and generating a feasible path corresponding to the reference path based on the extracted state.

19 Claims, 7 Drawing Sheets

METHOD AND SYSTEM FOR GENERATING OBSTACLE AVOIDANCE PATH

CROSS-REFERENCE TO RELATED APPLICATION

This application claims priority under 35 U.S.C. § 119 to Korean Patent Application No. 10-2023-0063617, filed on May 17, 2023, in the Korean Intellectual Property Office (KIPO), the disclosure of which is incorporated by reference herein in its entirety.

TECHNICAL FIELD

The present disclosure relates to a method and system for generating an obstacle avoidance path, and more particularly, to a method and system for generating an obstacle avoidance path that a non-holonomic moving object may follow.

BACKGROUND

Recently, with the development of autonomous driving technology, various path planning algorithms have been developed in which moving objects, such as vehicles and robots, recognize obstacles by themselves and avoid them to drive. In the case of using such a path planning algorithm, an autonomous driving path capable of avoiding an obstacle may be generated even when the obstacle exists at an unstandardized location.

Meanwhile, it may be difficult for non-holonomic moving objects, such as vehicles and robots, to accurately follow a path generated by a path planning algorithm. For example, a non-holonomic moving object may have certain constraints on driving and turning, and due to these constraints, the non-holonomic moving object may collide with an obstacle even when driving while following a path.

SUMMARY

In view of the above, the present disclosure provides a method for generating an obstacle avoidance path, a computer program stored in a computer-readable medium, a computer-readable medium in which the computer program is stored, and a system (device).

The present disclosure may be implemented in a variety of manners including methods, systems (devices), computer programs stored in computer-readable mediums, or computer-readable mediums in which computer programs are stored.

In an aspect, a method for generating an obstacle avoidance path, performed by at least one processor includes: generating a reference path from an initial location to a target location for a moving object to move; providing the generated reference path to a controller for generating a control value of the moving object to generate a control value corresponding to the reference path; providing the generated control value to a kinematic model related to the moving object to extract a state for the moving object to follow the reference path; and generating a feasible path corresponding to the reference path based on the extracted state.

The method may further include: determining a final trajectory from the initial location to the target location for the moving object to move based on a path candidate group including the generated feasible path.

The determining of the final trajectory from the initial location to the target location for the moving object to move may include determining the final trajectory using a rapidly exploring random tree (RRT)-based algorithm.

The determining of the final trajectory using the RRT-based algorithm may include: extracting the generated feasible path from the path candidate group as a random sample; and determining the final trajectory based on connection of the extracted random sample to a path tree related to the RRT-based algorithm.

The determining of the final trajectory based on connection of the extracted random sample to a path tree related to the RRT-based algorithm may include: extracting a first node at which cost with the random sample is minimized from among nodes of the path tree; and determining the final trajectory based on connection of the random sample to the extracted first node.

The determining of the final trajectory based on connection of the extracted random sample to a path tree related to the RRT-based algorithm may include: when the path tree is connected to the random sample, extracting a second node at which cost from an initial location of the path tree to the random sample is minimized, among a plurality of nodes existing within a predetermined range of the random sample; and determining the final trajectory based on reconnection of the random sample to the extracted second node.

The generating of the reference path from the initial location to the target location for the moving object to move may include generating the reference path based on a polynomial-based path generation algorithm.

The controller may be a closed-loop controller based on the Stanley algorithm.

The generating of a feasible path corresponding to the reference path based on the extracted state may include: calculating a lateral error value of the kinematic model using the extracted state; correcting the control value corresponding to the reference path based on the calculated lateral error value; and generating a feasible path corresponding to the reference path based on a state regenerated by the kinematic model based on the corrected control value.

The control value generated by the controller may include an acceleration value and a steering value related to the moving object.

In another aspect, a moving object system includes: a path candidate group generator configured to generate a plurality of feasible paths that a moving object may follow; and a final path determiner configured to determine a final trajectory from an initial location to a target location for the moving object to move based on the generated path candidate group.

The path candidate group generator may include: a reference path generator configured to generate a reference path from the initial location to the target location for the moving object to move; a controller configured to acquire the reference path generated by the reference path generator and generate a control value of the moving object corresponding to the reference path; a kinematic model configured to acquire the control value generated by the controller and extract a state for the moving object to follow the reference path; and a path fitting unit configured to generate a feasible path corresponding to the reference path based on the extracted state.

The reference path generator may be configured to generate the reference path based on a polynomial-based path generation algorithm.

The controller may be a closed-loop controller based on a Stanley algorithm.

The control value generated by the controller may include an acceleration value and a steering value related to the moving object.

The path candidate group generator may be configured to calculate a lateral error value of the kinematic model using the extracted state, correct a control value corresponding to the reference path based on the calculated lateral error value, and generate a feasible path corresponding to the reference path based on a state regenerated by the kinematic model based on the corrected control value.

The final path determiner may be configured to determine the final trajectory using a rapidly exploring random tree (RRT)-based algorithm.

The final path determiner may be configured to extract the generated feasible path from the path candidate group as a random sample, and
determine the final trajectory based on connection of the extracted random sample to a path tree related to the RRT-based algorithm.

The final path determiner may be configured to extract a first node at which cost with the random sample is minimized from among nodes of the path tree, and determine the final trajectory based on connection of the random sample to the extracted first node.

The final path determiner may be configured to extract, when the path tree is connected to the random sample, a second node at which cost from the initial location of the path tree to the random sample is minimized, among a plurality of nodes existing within a predetermined range in the random sample, and determine the final trajectory based on reconnection of the random sample to the extracted second node.

In various embodiments of the present disclosure, a complex path generated by a polynomial-based algorithm may be fitted into a feasible path capable of collision avoidance through smoothing, and an optimal trajectory that a non-holonomic moving object may follow may be generated by configuring random samples of a rapidly exploring random tree (RRT)-based algorithm as feasible paths.

In various embodiments of the present disclosure, an optimal feasible path corresponding to a reference path may be generated through interaction between a controller and a kinematic model.

In various embodiments of the present disclosure, unlike general RRT-based algorithms, a trajectory that effectively prevents a collision of a non-holonomic moving object may be generated by a using random sample as a feasible path.

The effects of the present disclosure are not limited to the effects mentioned above, and other effects not mentioned may be clearly understood by those skilled in the art (referred to as "ordinary people") from the description of the claims.

DETAILED DESCRIPTION

Hereinafter, specific details for the implementation of the present disclosure will be described in detail with reference to the accompanying drawings. However, in the following description, if there is a risk of unnecessarily obscuring the gist of the present disclosure, detailed descriptions of well-known functions or configurations will be omitted.

In the accompanying drawings, identical or corresponding elements are given the same reference numerals. In addition, in the description of the following embodiments, overlapping descriptions of the same or corresponding components may be omitted. However, omission of a description of a component does not intend that such a component is not included in an embodiment.

Advantages and features of the present disclosure and a method of achieving the advantages and features of the present disclosure will be clearly understood from embodiments described hereinafter in conjunction with the accompanying drawings. However, the present disclosure is not limited to the following embodiments and may be realized in various different forms. These embodiments are provided only to completely disclose the present disclosure and for a person having ordinary skill in the art to which the present disclosure pertains to completely understand the category of the disclosure.

Terms to be used in the following embodiments will hereinafter be described in detail, and a detailed description of embodiments is as follows. Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

As used herein, the singular forms "a," "an," and "the" may be intended to include the plural forms as well, unless the context clearly indicates otherwise. Terms used in the following description are used only to describe the specific embodiments and are not intended to restrict the present disclosure. A singular expression may include a plural expression unless otherwise stated in context.

In the present disclosure, the terms "include," "including" and the like may indicate that features, steps, operations, elements and/or components are present, but such terms do not preclude the addition of one or more other functions, steps, operations, elements, components and/or combinations thereof.

In the present disclosure, when a specific component is referred to as "coupling," "combining," "connecting," or "reacting" to any other component, the specific component may be directly coupled to, combined with, and/or connected to, or reacted with other components, but is not limited thereto. For example, one or more intermediate components may exist between certain components and other components. Also, in the present disclosure, "and/or" may include each of one or more items listed or a combination of at least a some of one or more items.

In the present disclosure, terms, such as "first" and "second" are used to distinguish a specific component from other components, and the aforementioned components are not limited by these terms. For example, a "first" component may have the same or similar shape as a "second" component.

In the present disclosure, a "moving object" may be an object that moves, such as a vehicle, and may refer to a non-holonomic moving object having a behavioral constraint.

In the present disclosure, a "feasible path" may refer to a path that a non-holonomic moving object having constraints may follow.

In the present disclosure, "rapidly exploring random tree (RRT)-based algorithm" is a sampling-based path planning algorithm, which may refer to an algorithm that randomly generates several sample points and generates an avoidance path not colliding with obstacles based on whether a path connecting two sample points collides with an obstacle.

Figure 1:
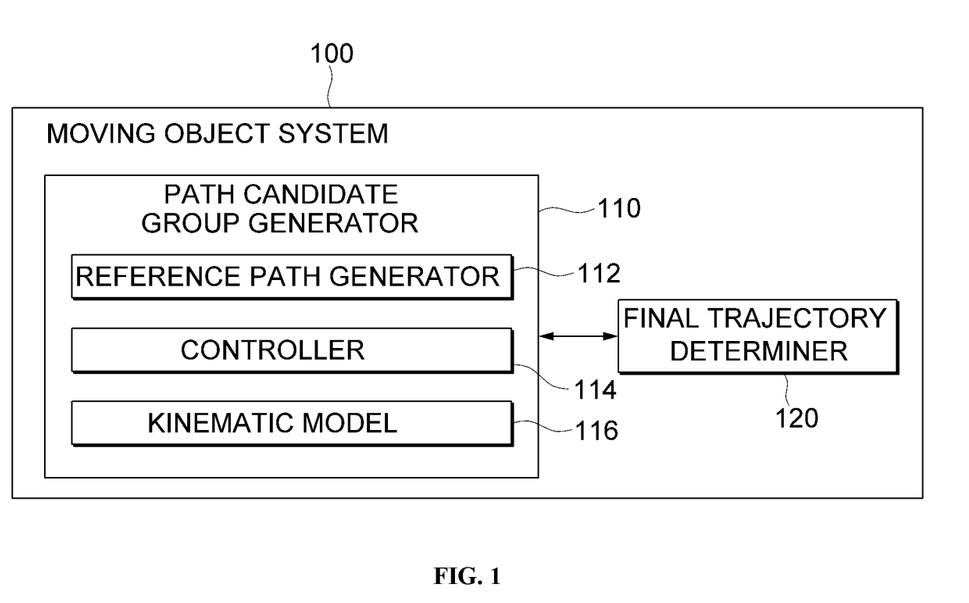
FIG. 1 is a functional block diagram illustrating an internal configuration of a moving object system according to an embodiment of the present disclosure.

FIG. 1 is a functional block diagram illustrating an internal configuration of a moving object system 100 according to an embodiment of the present disclosure. As shown, the moving object system 100 refers to any system for controlling or driving a moving object, and may include a path candidate group generator 110, a final trajectory determiner 120, etc., but is not limited thereto. In addition, the path candidate group generator 110 is illustrated as including a reference path generator 112, a controller 114, a kinematic model 116, and the like, but is not limited thereto.

According to an embodiment, the moving object system 100 may generate a path for avoiding obstacles in a continuous space in a city including obstacles in irregular locations, such as illegal parking spaces and construction sections. For example, the moving object system 100 may generate a plurality of feasible paths in a continuous space and generate an obstacle avoidance path through a first phase of generating a path candidate group and a second phase of determining a final trajectory from an initial location to a target location for the moving object to move using the generated path candidate group.

According to an embodiment, the path candidate group generator 110 may generate a plurality of feasible paths and configure a path candidate group including the plurality of generated feasible paths. First, the reference path generator 112 of the path candidate group generator 110 may generate a reference path and subsequently generate a feasible path based on the generated reference path. Here, the reference path may refer to a path configured to avoid obstacles in a continuous space in which the moving object moves, and may be generated based on a polynomial-based path generation algorithm. For example, the reference path generator 112 may generate the reference path based on the fifth order polynomial of Equation 1.

[Equation 1]

$$y = ax^5 + bx^4 + cx^3 + dx^2 + ex + f \quad (1)$$

$$y = 5ax^4 + 4bx^3 + 3cx^2 + 2dx + e \quad (2)$$

$$y = 20ax^3 + 12bx^2 + 6cx + 2d \quad (3)$$

Here, Equation (1) may represent the location of the reference path, Equation (2) may represent a heading direction of the reference path, and Equation (3) may represent a curvature of the reference path. That is, the reference path generator 112 may generate various reference paths by adjusting the initial location and the target location based on Equation 1 described above, and may generate, for example, a reference path having longitudinal dynamics for a specific time interval (e.g., 6 seconds).

When the reference path is generated in this manner, the path candidate group generator 110 may use the controller 114 and the kinematic model 116 to fit the reference path into a feasible path that an actual moving object may follow. For example, the path candidate group generator 110 may provide the generated reference path to the controller 114 to generate a control value corresponding to the reference path and may provide the generated control value to the kinematic model 116 related to the moving object to extract a state for the moving object to follow the reference path. Thereafter, the path candidate group generator 110 may generate a feasible path corresponding to the reference path based on the extracted state.

According to an embodiment, the controller 114 is for generating control values, such as an acceleration value and a steering value for the moving object to follow the reference path and may be a closed-loop controller based on the Stanley algorithm. Here, the Stanley algorithm may be an algorithm of a path-following approach and may refer to an algorithm that follows a reference path using an equation of motion of a moving object, a geometry of a reference path, and a heading direction of the moving object. That is, based on the Stanley algorithm, the controller 114 may generate a control value of the moving object corresponding to the Stanley algorithm, and then provide the generated control value to the kinematic model 116 that implements the motion of the moving object.

According to an embodiment, the kinematic model 116 may receive the control value from the controller 114 and predict a driving and moving path of the moving object according to the corresponding control value. Here, the kinematic model 116 may be a prediction model that implements the constraints of the non-holonomic moving object as it is. That is, the kinematic model 116 may extract the state of the moving object by driving the moving object according to the control value and identifying the moving path according to the control value. Here, the state may be a value indicating a location, acceleration, and the like when the moving object travels on the feasible path.

According to an embodiment, the controller 114 may receive the reference path and state in the form of feedback and determine a lateral error value and a heading error value indicating a difference between the reference path and the moving path of the moving object. Thereafter, the controller 114 may correct the control value based on the determined lateral error value, heading directional error value, and the like. The corrected control value may be provided to the kinematic model 116 again, and a state may be regenerated based on the corrected control value. When a path minimizing the error value is generated by repeating the above process, the path candidate group generator 110 may determine the path as a feasible path corresponding to the reference path.

When a path candidate group including a plurality of feasible paths is generated by the path candidate group generator 110, the final trajectory determiner 120 may determine a final trajectory from the initial location to the target location for the moving object to move using the path candidate group. For example, the final trajectory determiner 120 may determine the final trajectory using an RRT-based algorithm.

According to an embodiment, the final trajectory determiner 120 may extract the feasible path generated from the path candidate group as a random sample and determine the final trajectory based on connection of the extracted random sample to a path tree related to the RRT-based algorithm. That is, unlike using a general RRT-based algorithm, the final trajectory determiner 120 may extract the feasible path, rather than a node representing one point, as a random sample and connects the extracted random sample to the path tree, thereby determining the final trajectory that the non-holonomic moving object may follow.

In FIG. 1, each functional configuration included in the moving object system 100 is separately described, but this is only to help understanding of the present disclosure, and one arithmetic device may perform two or more functions. With this configuration, it is possible to fit a complex path generated by a polynomial-based algorithm into a feasible path capable of collision free through smoothing, and an optimal trajectory that the non-holonomic moving object may follow may be generated by configuring the random sample of the RRT-based algorithm as feasible paths.

Figure 2:
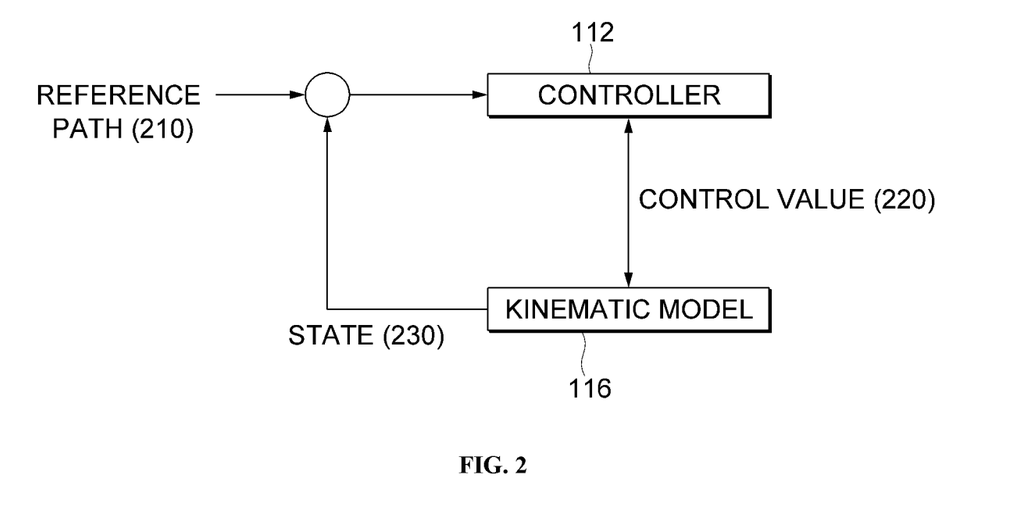
FIG. 2 is a block diagram illustrating an example of a process in which a closed loop-based controller operates according to an embodiment of the present disclosure.

FIG. 2 is a block diagram illustrating an example of a process in which the closed loop-based controller 114 operates according to an embodiment of the present disclosure. As described above, the controller 114 may be a closed-loop controller based on the Stanley algorithm. That is, the controller 114 may generate an optimal feasible path by repeatedly generating or correcting the control value 220 through feedback.

According to an embodiment, the controller 114 may receive the reference path 210 and generate the control value 220 corresponding to the reference path. Here, the control value 220 may include an acceleration value and a steering value related to the moving object. The control values 220 generated thusly may be provided to the kinematic model 116. The kinematic model 116 may predict the motion of the moving object based on the control value 220 and extract a state 230 corresponding to the predicted motion.

According to an embodiment, a lateral error value and/or a directional error value of the kinematic model 116 may be calculated based on the extracted state 230. In this case, the controller 114 may correct the control value 220 corresponding to the reference path 210 based on the calculated lateral error value and/or directional error value. The control value 220 corrected thusly may be provided to the kinematic model 116 again, and the kinematic model 116 may predict the motion of the moving object based on the corrected control value 220 and regenerate the state 230 corresponding to the predicted motion. As described above, when the process of correcting the control value 220 and regenerating the state 230 is sufficiently repeated, a feasible path corresponding to the reference path 210 may be generated.

According to an embodiment, the Stanley-based controller 114 may operate based on Equation 2 below.

[Equation 2]

$$\delta(t) = \begin{cases} \psi(t) + \arctan\left(\frac{ke(t)}{V(t)}\right) & \left|\psi(t) + \arctan\left(\frac{ke(t)}{V(t)}\right)\right| < \delta(\max) \\ \delta(\max) & \left|\psi(t) + \arctan\left(\frac{ke(t)}{V(t)}\right)\right| \geq \delta(\max) \\ -\delta(\max) & \left|\psi(t) + \arctan\left(\frac{ke(t)}{V(t)}\right)\right| \leq -\delta(\max) \end{cases}$$

Here, $\psi$ may denote the heading direction of the moving object, and $e(t)$ may denote the lateral error value. Additionally, the kinematic model 116 may extract the state of the moving object for a specific time interval based on Equation 3 below.

[Equation 3]

$$\theta_{(N)} = \theta_{(N-1)} + \frac{V \tan\delta}{L}\Delta$$

$$X_{f(N)} = X_{f(N-1)} + V\cos(\theta + \delta)\Delta$$

$$Y_{f(N)} = Y_{f(N-1)} + V\sin(\theta + \delta)\Delta$$

Here, $\theta_{(N)}$, $X_{f(N)}$ and $Y_{f(N)}$ each constitute the state of the moving object, and $X_{f(N)}$ and $Y_{f(N)}$ may denote a global frontal position of the moving object in both directions, and $\theta_{(N)}$ may denote a heading angle. In addition, V may denote a longitudinal speed of the moving object, and $\delta$ and L may denote steering angles measured by an absolute encoder and a wheelbase related to front wheels of the moving object. Additionally, N is for dividing each time interval and may be determined as a natural number.

With this configuration, the controller 114 may calculate and provide a control value that minimizes the heading error value and the lateral error value to the kinematic model 116, and the kinematic model 116 may calculate a state including the location and the heading angle of the moving object through the provided control value and provide the calculated state to the controller 114 again. Through the interaction between the controller 114 and the kinematic model 116, an optimal feasible path corresponding to the reference path may be generated.

Figure 3:
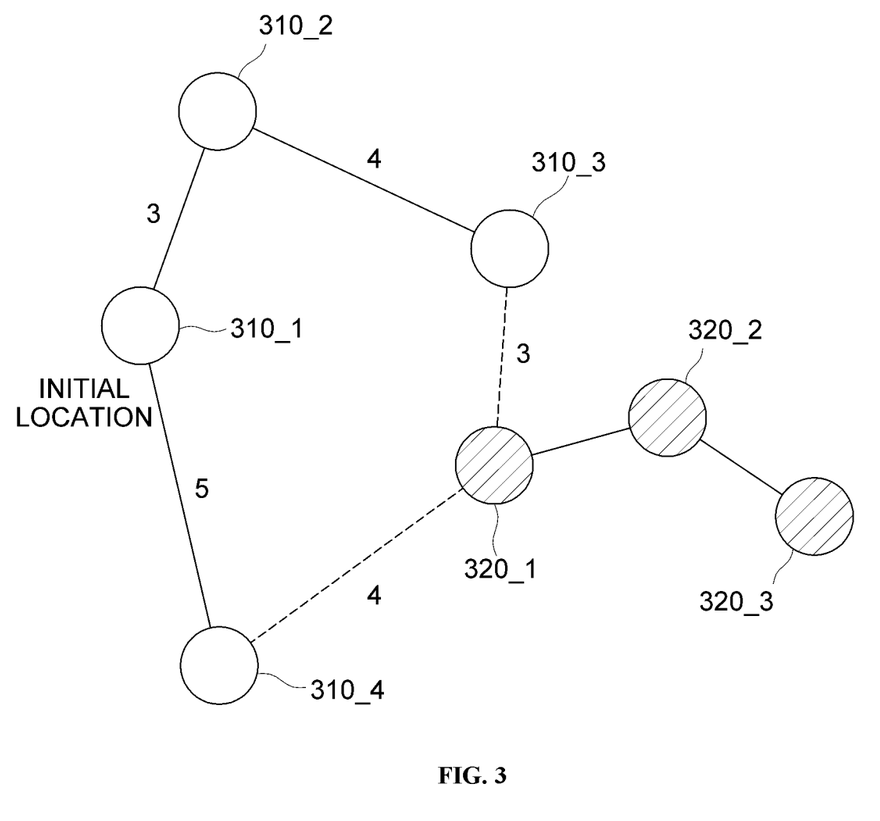
FIG. 3 is a diagram illustrating an example in which a trajectory is generated by a rapidly exploring random tree (RRT)-based algorithm according to an embodiment of the present disclosure.

FIG. 3 is a diagram illustrating an example in which a trajectory is generated based on an RRT-based algorithm according to an embodiment of the present disclosure. As described above, the moving object system (100 in FIG. 1) may determine the final trajectory using the RRT-based algorithm. For example, the moving object system may extract a feasible path 320 generated from a path candidate group as a random sample and connect the extracted random sample to a path tree 310 related to the RRT-based algorithm to determine a final trajectory.

In the illustrated example, a first node 310_1, a second node 310_2, a third node 310_3, and a fourth node 310_4 may represent a predetermined path tree 310. Here, the first node 310_1 may indicate an initial location of the trajectory. Also, a fifth node 320_1, a sixth node 320_2, and a seventh node 320_3 may indicate a feasible path 320 randomly extracted from the path candidate group. According to an embodiment, the moving object system may connect the feasible path 320 to the path tree 310 to determine at least a portion of the final trajectory.

According to an embodiment, the moving object system may extract a node at which cost with the feasible path 320, among nodes of the path tree 310, is minimized. In the illustrated example, the third node 310_3 closest to the feasible path 320 may be extracted as the node incurring the minimum cost, and the third node 310_3 may be connected to the fifth node 320_1.

In this manner, when the path tree 310 is connected to the feasible path 320, the moving object system may determine whether the cost from the initial location to the feasible path 320 is minimized. That is, the moving object system may extract a node having the lowest cost from the initial location of the path tree 310 to the feasible path 320, among a plurality of nodes existing within a predetermined range of the feasible path 320 and reconnect the feasible path 320 to the extracted node to determine at least a portion of the final trajectory. In the illustrated example, cost (distance) for connection to the fifth node 320_1 via the first node 310_1, the second node 310_2, and the third node 310_3 may be determined to be 10, and cost for connection to the fifth node 320_1 through the first node (310_1) and the fourth node 310_4 may be determined to be 9. Accordingly, the moving object system may disconnect the third node 310_3 and the fifth node 320_1 and connect the fourth node 310_4 and the fifth node 320_1.

The aforementioned process may be repeatedly performed by a plurality of feasible paths included in the path candidate group, and when the trajectory connecting from the initial location to the final location is completed, the corresponding process may be terminated and an obstacle avoidance path may be generated. With this configuration, unlike a general RRT-based algorithm, the trajectory that effectively prevents a collision of the non-holonomic moving object may be generated by using the random sample as the feasible path 320.

Figure 4:
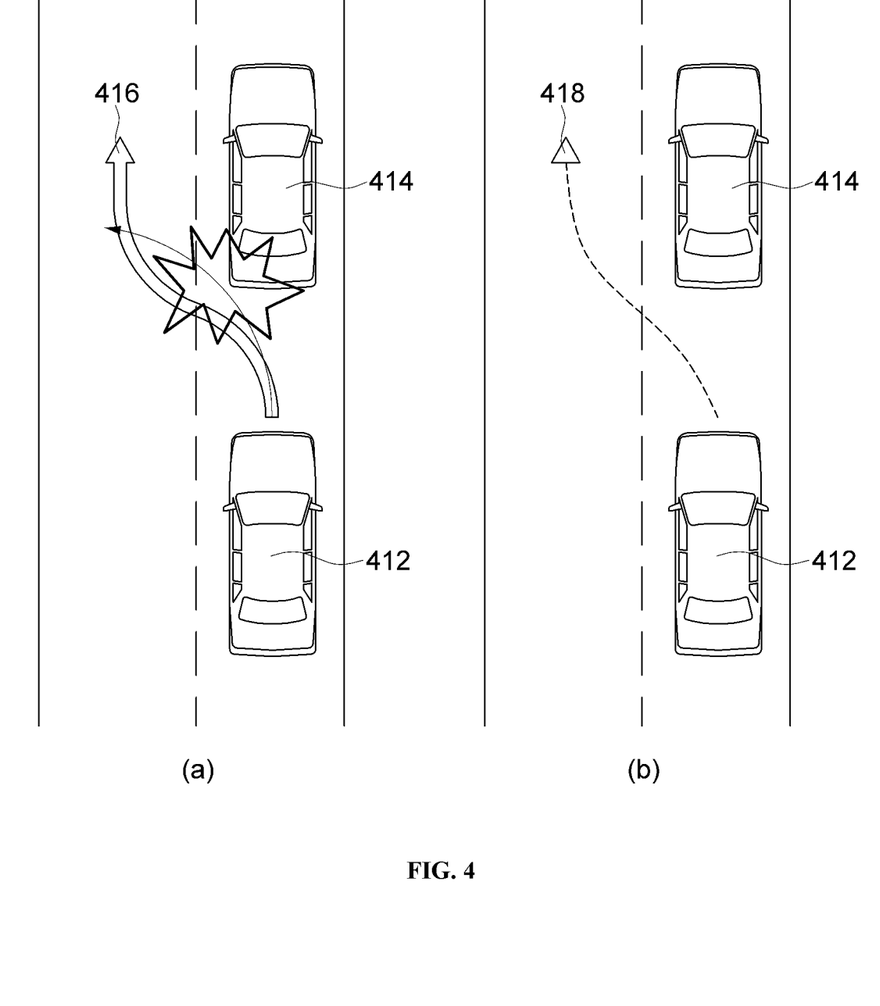
FIG. 4 is a diagram illustrating an example in which a feasible path is generated so that a moving object avoids an obstacle according to an embodiment of the present disclosure.

FIG. 4 is a diagram illustrating an example in which a feasible path 418 is generated so that the moving object 412 avoids an obstacle 414 according to an embodiment of the present disclosure. As described above, the moving object system (100 in FIG. 1) may generate a reference path 416 using a polynomial-based path generation algorithm. Here, it may not be guaranteed whether the reference path 416 is feasible for the non-holonomic moving object 412 to follow. That is, due to constraints of the moving object 412, the moving object may not accurately follow the reference path 416.

As shown in (a) of FIG. 4, the moving object 412 may operate to follow the reference path 416 as much as possible according to A control value obtained by the controller. However, it may be difficult for the moving object 412 to follow the reference path 416 without an error, and thus, a collision may occur between the obstacle 414 and the moving object 412. To solve this problem, as shown in (b) of FIG. 4, a feasible path 418 may be generated based on the reference path 416. That is, the feasible path 418 may indicate a path along which the moving object 412 may move without colliding with the obstacle 414, despite the constraints of the moving object.

Figure 5:
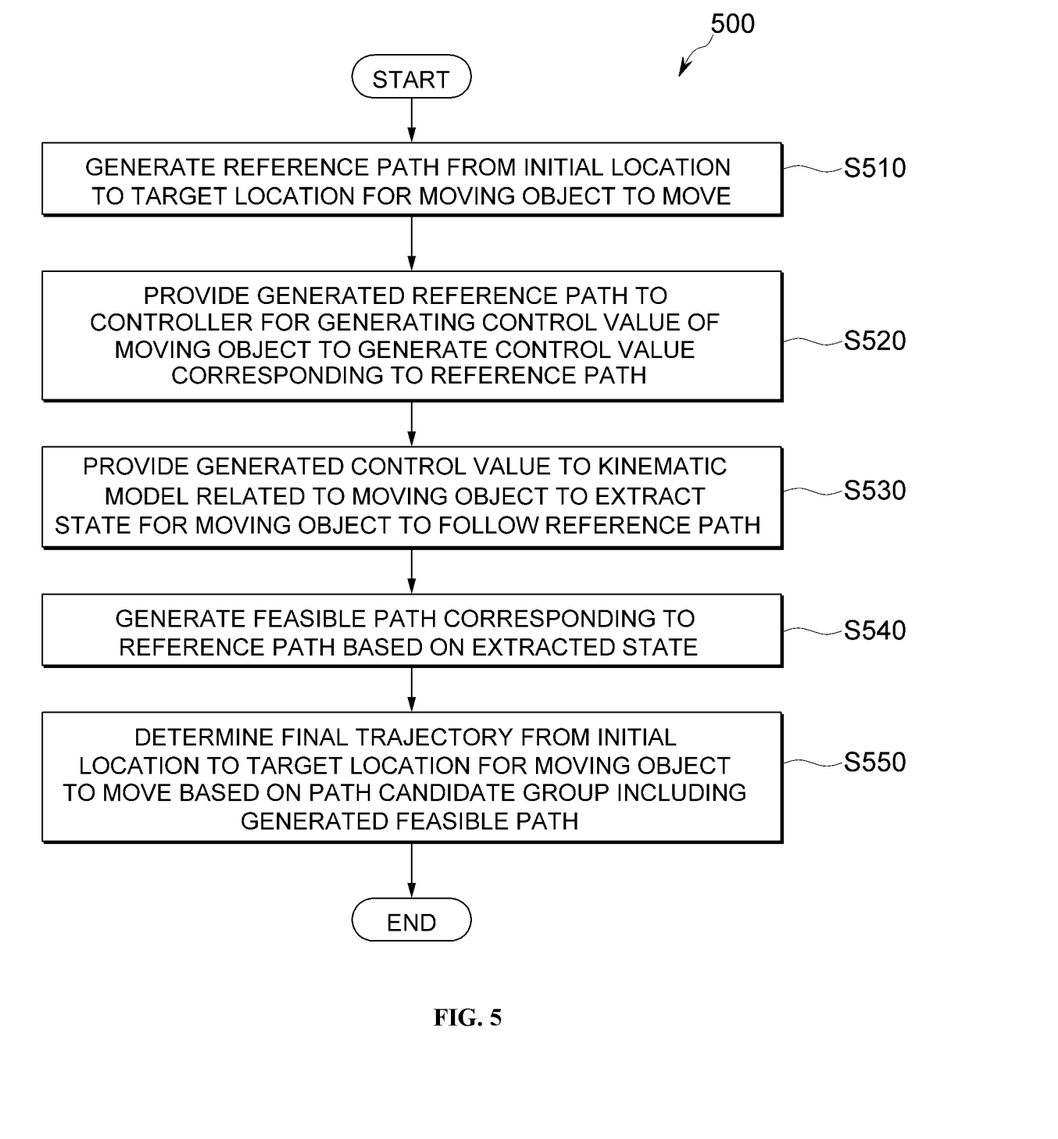
FIG. 5 is a flowchart illustrating an example of a method for generating an obstacle avoidance path according to an embodiment of the present disclosure.

FIG. 5 is a flowchart illustrating an example of a method 500 for generating an obstacle avoidance path according to an embodiment of the present disclosure. The method 500 for generating an obstacle avoidance path may be performed by at least one processor (e.g., at least one processor of a moving object system). The method 500 for generating an obstacle avoidance path may be started by a processor generating a reference path from an initial location to a target location for a moving object to move (S510). For example, the processor may generate a reference path based on a polynomial-based path generation algorithm.

The processor may provide the generated reference path to a controller for generating a control value of the moving object to generate a control value corresponding to the reference path (S520). Here, the controller may be a closed-loop controller based on the Stanley algorithm, and the control value generated by the controller may include an acceleration value and a steering value related to the moving object.

The processor may provide the generated control value to a kinematic model related to the moving object to extract a state for the moving object to follow the reference path (S530). Also, the processor may generate a feasible path corresponding to the reference path based on the extracted state (S540). For example, the processor may calculate a lateral error value of the kinematic model using the extracted state, correct the control value corresponding to the reference path based on the calculated lateral error value, and generate the feasible path corresponding to the reference path based on the state regenerated by the kinematic model based on the corrected control value. Thereafter, the processor may determine a final trajectory from the initial location to the target location for the moving object to move based on a path candidate group including the generated feasible path.

Figure 6:
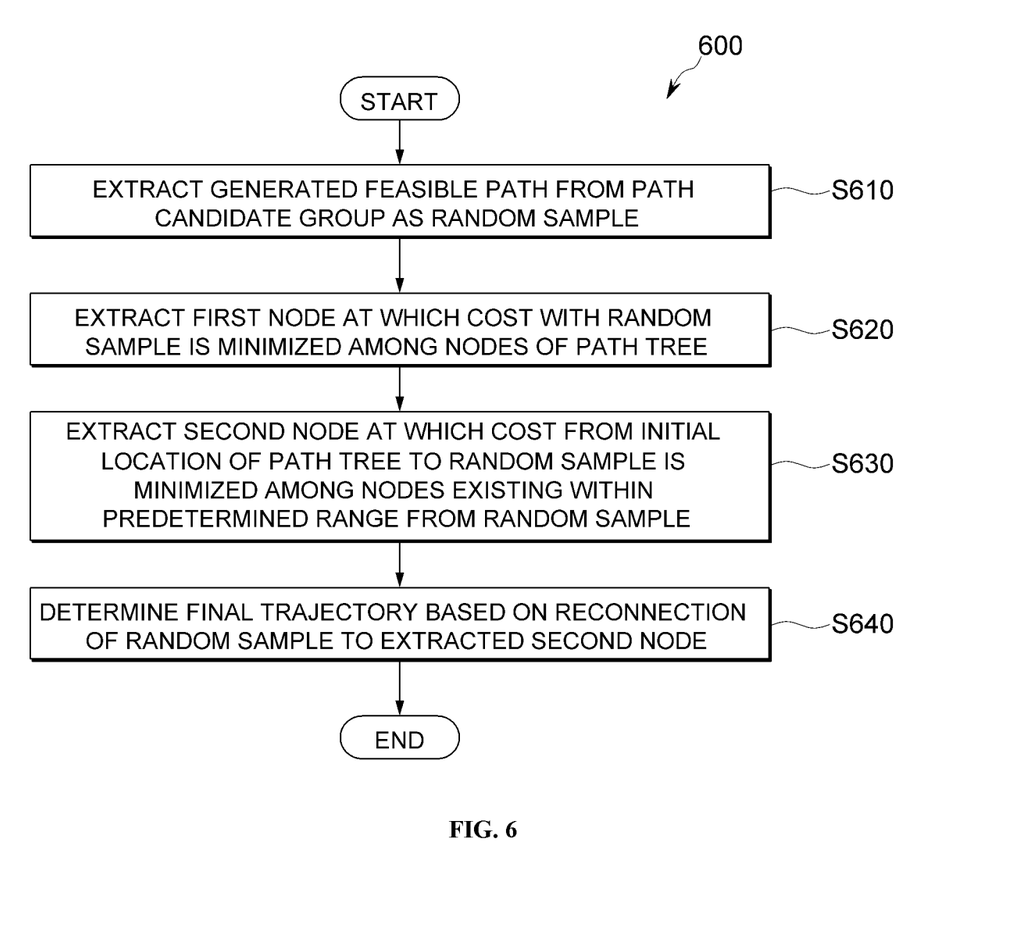
FIG. 6 is a flowchart illustrating an example of a method for determining a final trajectory according to an embodiment of the present disclosure.

FIG. 6 is a flowchart illustrating an example of a method 600 for determining a final trajectory according to an embodiment of the present disclosure. The method 600 for determining a final trajectory may be performed by at least one processor (e.g., at least one processor of a moving object system). For example, the processor may determine the final trajectory using an RRT-based algorithm. The method 600 for determining a final trajectory may be started by a processor extracting a feasible path generated from a route candidate group as a random sample (S610).

The processor may extract a first node at which cost with a random sample is minimized from among nodes of a path tree (S620). Also, the processor may connect the extracted first node to the random sample. When the path tree is connected to the random sample, the processor may extract a second node incurring a minimum cost from an initial location of the path tree to the random sample from among a plurality of nodes existing within a predetermined range from the random sample (S630). Thereafter, the processor may determine a final trajectory based on reconnection of the random sample and the extracted second node (S640).

Figure 7:
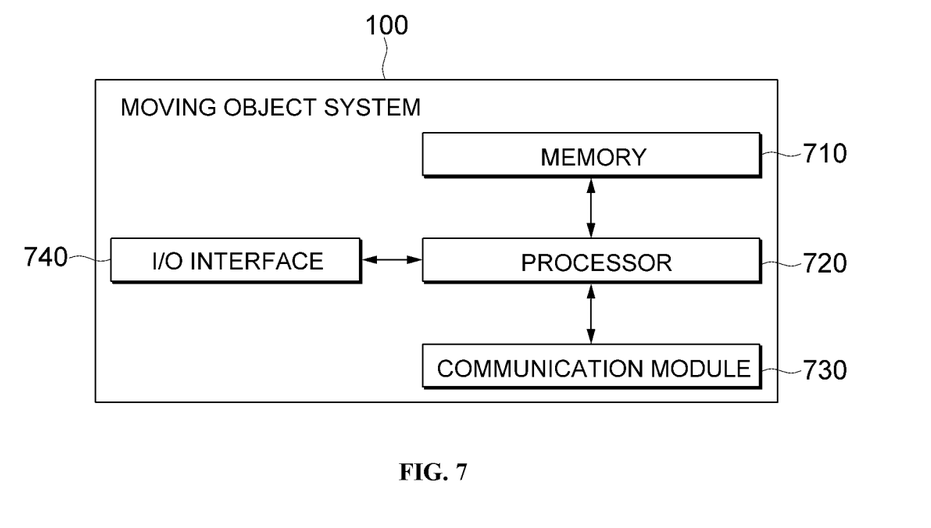
FIG. 7 is a block diagram illustrating the internal configuration of a moving object system according to an embodiment of the present disclosure.

FIG. 7 is a block diagram illustrating an internal configuration of the moving object system 100 according to an embodiment of the present disclosure. According to an embodiment, the moving object system 100 may include a memory 710, a processor 720, a communication module 730, and an input/output (I/O) interface 740, and as shown in FIG. 7, the moving object system 100 may be configured to communicate information and/or data over a network using the communication module 730.

The memory 710 may include any non-transitory computer-readable storage medium. According to an embodiment, the memory 710 may include a permanent mass storage device, such as random access memory (RAM), read only memory (ROM), disk drive, solid state drive (SSD), flash memory, and the like. As another example, the permanent mass storage device, such as a ROM, SSD, flash memory, disk drive, and the like may be included in the moving object system 100 as a separate permanent storage device distinguished from the memory. Also, an operating system and at least one program code may be stored in the memory 710.

These software components may be loaded from a computer-readable recording medium separate from the memory 710. The separate computer-readable recording medium may include a recording medium directly connectable to the moving object system 100, for example, a floppy drive, a disk, a tape, a DVD/CD-ROM drive, a memory card, etc. As another example, software components may be loaded into the memory 710 through the communication module 730 rather than a computer-readable recording medium. For example, at least one program may be loaded into the memory 710 based on a computer program installed by files provided by developers or a file distribution system that distributes application installation files through the communication module 730.

The processor 720 may be configured to process commands of a computer program by performing basic arithmetic, logic, and I/O operations. Commands may be provided to other user terminals (not shown) or other external systems by the memory 710 or the communication module 730.

The communication module 730 may provide a configuration or function for a user terminal (not shown) and the moving object system 100 to communicate with each other through a network, and the moving object system 100 may provide a configuration or function to communicate with an external system (e.g., a separate cloud system). For example, control signals, commands, data, etc. provided under the control of the processor 720 of the moving object system 100 may be transmitted to a user terminal and/or an external system through a communication module of the user terminal and/or the external system via the communication module 730 and the network.

In addition, the I/O interface 740 of the moving object system 100 may be connected to the moving object system 100 or may be a unit for interface with a device (not shown) for input or output that may be included in the moving object system 100. In FIG. 7, the I/O interface 740 is illustrated as an element separately configured from the processor 720, but is not limited thereto, and the I/O interface 740 may be included in the processor 720. The moving object system 100 may include more components than those shown in FIG. 7. However, there is no need to clearly show most of the related art components.

The processor 720 of the moving object system 100 may be configured to manage, process, and/or store information and/or data received from a plurality of user terminals and/or a plurality of external systems.

The aforementioned methods and/or various embodiments may be realized by digital electronic circuits, computer hardware, firmware, software, and/or combinations thereof. Various embodiments of the present disclosure may be implemented by a data processing device, for example, one or more programmable processors and/or one or more computing devices or by a computer-readable recording medium and/or a computer program stored in the computer-readable recording medium. The aforementioned computer program may be written in any form of programming language, including compiled or interpreted languages, and may be distributed in any form, such as a stand-alone program, module, or subroutine. The computer program may be distributed over one computing device, multiple computing devices connected through the same network, and/or multiple computing devices distributed to be connected through multiple different networks.

The methods and/or various embodiments described above may be performed by one or more processors configured to execute one or more computer programs that process, store, and/or manage certain functions, functions, or the like, by operating based on input data or generating output data. For example, the method and/or various embodiments of the present disclosure may be performed by a special purpose logic circuit, such as a field programmable gate array (FPGA) or an application specific integrated circuit (ASIC), and a device and/or system for performing the method and/or embodiments of the present disclosure may be implemented as a special purpose logic circuit, such as an FPGA or an ASIC.

One or more processors executing the computer program may include a general purpose or special purpose microprocessor and/or one or more processors of any kind of digital computing device. The processor may receive instructions and/or data from each of a read-only memory and a random access memory or receive instructions and/or data from the read-only memory and the random access memory. In the present disclosure, components of a computing device performing methods and/or embodiments may include one or more processors for executing instructions and one or more memory devices for storing instructions and/or data.

According to an embodiment, a computing device may exchange data with one or more mass storage devices for storing data. For example, the computing device may receive data from and/or transfer data to a magnetic or optical disc. A computer-readable storage medium suitable for storing instructions and/or data related to a computer program may include, but is not limited to, any type of non-volatile memory, including semiconductor memory devices, such as erasable programmable read-only memory (EPROM), electrically erasable PROM (EEPROM), and a flash memory device. For example, the computer-readable storage medium may include magnetic disks, such as internal hard disks or removable disks, magneto-optical disks, CD-ROM and DVD-ROM disks.

To provide interaction with a user, a computing device may include, but is not limited to, a display device (e.g., a cathode ray tube (CRT), a liquid crystal display (LCD), etc.) for providing information to a user or displaying information, and a pointing device (e.g., a keyboard, a mouse, a trackball, etc.) through which a user may provide input and/or commands, etc., on the computing device. That is, the computing device may further include any other types of devices for providing interaction with a user. For example, the computing device may provide any form of sensory feedback including visual feedback, auditory feedback, and/or tactile feedback to a user for interaction with the user. In this regard, the user may provide input to the computing device through various gestures, such as sight, voice, and motion.

In the present disclosure, various embodiments may be implemented in a computing system including a back-end component (e.g., a data server), a middleware component (e.g., an application server), and/or a front-end component. In this case, the components may be interconnected by any form or medium of digital data communication, such as a communication network. For example, the communication network may include a local area network (LAN), a wide area network (WAN), and the like.

A computing device based on the example embodiments described herein may be implemented using hardware and/or software configured to interact with a user, including a user device, user interface (UI) device, a user terminal, or a client device. For example, the computing device may include a portable computing device, such as a laptop computer. Additionally or alternatively, the computing device may include, but are not limited to, personal digital assistants (PDAs), tablet PCs, game consoles, wearable devices, internet of things (IoT) devices, virtual reality (VR) devices, augmented reality (AR) devices, and the like. The computing device may further include other types of devices configured to interact with a user. Further, the computing device may include a portable communication device (e.g., a mobile phone, a smartphone, a wireless cellular phone, etc.) suitable for wireless communication over a network, such as a mobile communication network. The computing device may be configured to communicate wirelessly with a network server using wireless communication technologies and/or protocols, such as radio frequency (RF), microwave frequency (MWF), and/or infrared ray frequency (IRF).

The various embodiments herein, including specific structural and functional details, are examples. Accordingly, the embodiments of the present disclosure are not limited to those described above and may be implemented in various other forms. In addition, terms used in the present disclosure are for describing some embodiments and are not construed as limiting the embodiments. For example, the singular and the above may be construed to include the plural as well, unless the context clearly dictates otherwise.

In the present disclosure, unless defined otherwise, all terms used in this specification, including technical or scientific terms, have the same meaning as commonly understood by a person of ordinary skill in the art to which such concept belongs. In addition, terms commonly used, such as terms defined in a dictionary, should be interpreted as having a meaning consistent with the meaning in the context of the related technology.

Although the present disclosure has been described in relation to some embodiments in this specification, various modifications and changes may be made without departing from the scope of the present disclosure that may be understood by those skilled in the art. Moreover, such modifications and variations are intended to fall within the scope of the claims appended hereto.

What is claimed is:

1. A method for generating an obstacle avoidance path, performed by at least one processor, the method comprising:
   (a) generating a reference path from an initial location to a target location for a moving object to move;
   (b) providing the generated reference path to a controller for generating a control value of the moving object to generate a control value corresponding to the reference path;
   (c) providing the generated control value to a kinematic model related to the moving object to extract a state for the moving object to follow the reference path;
   (d) determining a lateral error value and a heading error value indicating difference between the reference path and a moving path corresponding to the extracted state;
   (e) correcting the control value based on the lateral error value and the heading error value;
   (f) re-extracting the state based on the corrected control value; and
   (g) generating a feasible path corresponding to the reference path based on the state extracted by repeatedly performing the steps (d) to (f) until the lateral error value and the heading error value are minimized.

2. The method of claim 1, further comprising:
   determining a final trajectory from the initial location to the target location for the moving object to move based on a path candidate group including the generated feasible path.

3. The method of claim 2, wherein the determining of the final trajectory from the initial location to the target location for the moving object to move includes determining the final trajectory using a rapidly exploring random tree (RRT)-based algorithm.

4. The method of claim 3, wherein
   the determining of the final trajectory using the RRT-based algorithm includes:
   extracting the generated feasible path from the path candidate group as a random sample; and
   determining the final trajectory based on connection of the extracted random sample to a path tree related to the RRT-based algorithm.

5. The method of claim 4, wherein
   the determining of the final trajectory based on connection of the extracted random sample to a path tree related to the RRT-based algorithm includes:
   extracting a first node at which cost with the random sample is minimized from among nodes of the path tree; and
   determining the final trajectory based on connection of the random sample to the extracted first node.

6. The method of claim 5, wherein
   the determining of the final trajectory based on connection of the extracted random sample to a path tree related to the RRT-based algorithm includes:
   when the path tree is connected to the random sample, extracting a second node at which cost from an initial location of the path tree to the random sample is minimized, among a plurality of nodes existing within a predetermined range of the random sample; and
   determining the final trajectory based on reconnection of the random sample to the extracted second node.

7. The method of claim 1, wherein the generating of the reference path from the initial location to the target location for the moving object to move includes generating the reference path based on a polynomial-based path generation algorithm.

8. The method of claim 1, wherein the controller is a closed-loop controller based on the Stanley algorithm.

9. The method of claim 1, wherein the control value generated by the controller includes an acceleration value and a steering value related to the moving object.

10. The method of claim 7, wherein the polynomial-based path generation algorithm includes a first polynomial representing a location of the reference path, a second polynomial representing a heading direction of the reference path and a third polynomial representing a curvature of the reference path.

11. A moving object system comprising:
    a path candidate group generator configured to generate a plurality of feasible paths that a moving object may follow; and
    a final path determiner configured to determine a final trajectory from an initial location to a target location for the moving object to move based on the generated path candidate group,
    wherein the path candidate group include:
    a reference path generator configured to generate a reference path from the initial location to the target location for the moving object to move;
    a controller configured to acquire the reference path generated by the reference path generator and generate a control value of the moving object corresponding to the reference path;

a kinematic model configured to acquire the control value generated by the controller and extract a state for the moving object to follow the reference path; and a path fitting unit configured to generate a feasible path corresponding to the reference path based on the extracted state, wherein the controller is configured to determine a lateral error value and a heading error value indicating a difference between the reference path and a moving path corresponding to the extracted state and correct the control value based on the lateral error value and the heading error value, wherein the kinematic model is configured to re-extract the state based on the corrected control value, and wherein the path fitting unit is configured to generate a feasible path corresponding to the reference path based on the state extracted when the lateral error value and the heading error value are minimized.

12. The moving object system of claim 11, wherein the reference path generator is configured to generate the reference path based on a polynomial-based path generation algorithm.

13. The moving object system of claim 11, wherein the controller is a closed-loop controller based on a Stanley algorithm.

14. The moving object system of claim 11, wherein the control value generated by the controller includes an acceleration value and a steering value related to the moving object.

15. The moving object system of claim 11, wherein the final path determiner is configured to determine the final trajectory using a rapidly exploring random tree (RRT)-based algorithm.

16. The moving object system of claim 15, wherein the final path determiner is configured to extract the generated feasible path from the path candidate group as a random sample, and determine the final trajectory based on connection of the extracted random sample to a path tree related to the RRT-based algorithm.

17. The moving object system of claim 16, wherein the final path determiner is configured to extract a first node at which cost with the random sample is minimized from among nodes of the path tree, and determine the final trajectory based on connection of the random sample to the extracted first node.

18. The moving object system of claim 17, wherein the final path determiner is configured to extract, when the path tree is connected to the random sample, a second node at which cost from the initial location of the path tree to the random sample is minimized, among a plurality of nodes existing within a predetermined range in the random sample, and determine the final trajectory based on reconnection of the random sample to the extracted second node.

19. The moving object system of claim 12, wherein the polynomial-based path generation algorithm includes a first polynomial representing a location of the reference path, a second polynomial representing a heading direction of the reference path and a third polynomial representing a curvature of the reference path.

* * * * *